(12) United States Patent
Dai

(10) Patent No.: US 9,329,420 B2
(45) Date of Patent: May 3, 2016

(54) ELECTRONIC DEVICE AND MANUFACTURING METHOD THEREOF

(71) Applicant: Wistron Corp., New Taipei (TW)

(72) Inventor: Shu-hua Dai, New Taipei (TW)

(73) Assignee: Wistron Corp., New Taipei (TW)

( * ) Notice: Subject to any disclaimer, the term of this patent is extended or adjusted under 35 U.S.C. 154(b) by 127 days.

(21) Appl. No.: 14/214,401

(22) Filed: Mar. 14, 2014

(65) Prior Publication Data

US 2015/0116629 A1 Apr. 30, 2015

(30) Foreign Application Priority Data

Oct. 25, 2013 (CN) .......................... 2013 1 0513871

(51) Int. Cl.
*G02F 1/1333* (2006.01)
*F21V 8/00* (2006.01)

(52) U.S. Cl.
CPC ........ *G02F 1/133308* (2013.01); *G02B 6/0051* (2013.01); *G02B 6/0053* (2013.01); *G02F 2001/13332* (2013.01); *G02F 2001/133325* (2013.01); *G02F 2001/133328* (2013.01); *Y10T 29/49126* (2015.01); *Y10T 29/49968* (2015.01)

(58) Field of Classification Search
None
See application file for complete search history.

(56) References Cited

U.S. PATENT DOCUMENTS 4,852,736 A * 8/1989 Kojima ................ G06K 19/077
235/1 D
7,290,695 B2 * 11/2007 Koga ................... B23K 20/123
228/2.1

* cited by examiner

*Primary Examiner* — Dung Nguyen
*Assistant Examiner* — Shan Liu

(57) ABSTRACT

A method for manufacturing an electronic device is provided, including the following steps. First, an outer frame is provided, wherein the outer frame comprises the first frame member and the second frame member. Next, the first frame member is connected to the second frame member by welding to form a connected structure, wherein a welded portion is formed between the first frame member and the second frame member. Then, a punch pin and a punch base are provided. Next, the connected structure is placed on the punch base. Finally, the connected structure is punched by the punch pin.

7 Claims, 4 Drawing Sheets

ELECTRONIC DEVICE AND MANUFACTURING METHOD THEREOF

CROSS REFERENCE TO RELATED APPLICATIONS

This application claims priority of China Patent Application No. 201310513871.9, filed on Oct. 25, 2013, the entirety of which is incorporated by reference herein.

BACKGROUND OF THE INVENTION

1. Field of the Invention

The present invention relates to a method for manufacturing an electronic device, and in particular to a method providing a smooth device appearance.

2. Description of the Related Art

The metal frame of a liquid-crystal television is made by combining separated pieces of sheet metal. Commonly, the metal frame is made by combining by four pieces of sheet metal (to form four sides of the metal frame), wherein the four pieces of sheet metal are connected to each other by welding. After the four pieces of sheet metal of the metal frame are welded together, the metal frame is punched to be bent. The welded portions (welding seams) between the pieces of sheet metal are not smooth. Conventionally, the welded portions are planarized by polishing. However, the polishing process reduces the thickness of the welded portion, and the surface sinking occurs on the welded portion after the metal frame is punched and bent.

BRIEF SUMMARY OF THE INVENTION

In one embodiment, a method for manufacturing an electronic device is provided, including the following steps. First, an outer frame is provided, wherein the outer frame comprises the first frame member and the second frame member. Next, the first frame member is connected to the second frame member by welding to form a connected structure, wherein a welded portion is formed between the first frame member and the second frame member. Then, a punch pin and a punch base are provided. Next, the connected structure is placed on the punch base. Finally, the connected structure is punched by the punch pin.

A method for manufacturing an electronic device is provided, including the following steps. First, an outer frame is provided, wherein the outer frame comprises the first frame member and the second frame member. Next, the first frame member is connected to the second frame member by welding to form a connected structure, wherein a welded portion is formed between the first frame member and the second frame member. Then, a punch pin and a punch base are provided. Next, the connected structure is placed on the punch base. Finally, the connected structure is punched by the punch pin.

Utilizing the method for manufacturing the electronic device of the embodiment of the invention, the welded portion between the frame members is planarized by punch-shaping, and the material of the welded portion need not be removed. Therefore, a surface sinking problem at the welded portion is prevented in the following punch-bending process. Additionally, the appearance of the outer frame can be punch-shaped rapidly. Compared to the conventional polishing process, the method of the embodiment of the invention reduces work time and cost.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
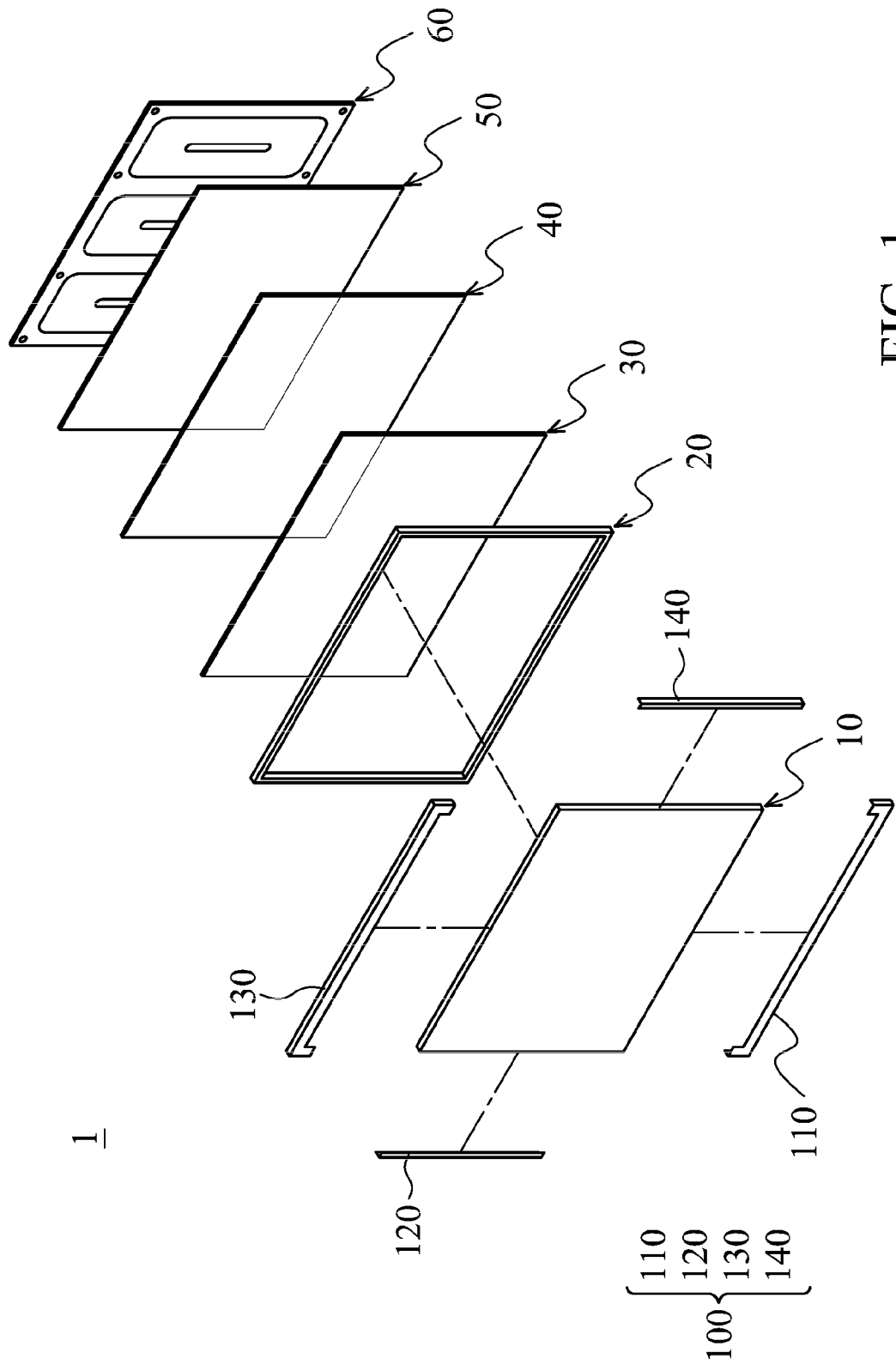
FIG. 1 shows the electronic device of the embodiment of the invention.

FIG. 1 shows an electronic device 1 of an embodiment of the invention, comprising a liquid-crystal display module 10, a plastic frame 20, a diffuser 30, a prism sheet 40, a light guide 50, a back panel 60 and an outer frame 100. The plastic frame 20, the diffuser 30, the prism sheet 40 and the light guide 50 are sandwiched between the liquid-crystal display module 10 and the back panel 60. The outer frame 100 comprises a first frame member 110, a second frame member 120, a third frame member 130 and a fourth frame member 140.

Figure 2:
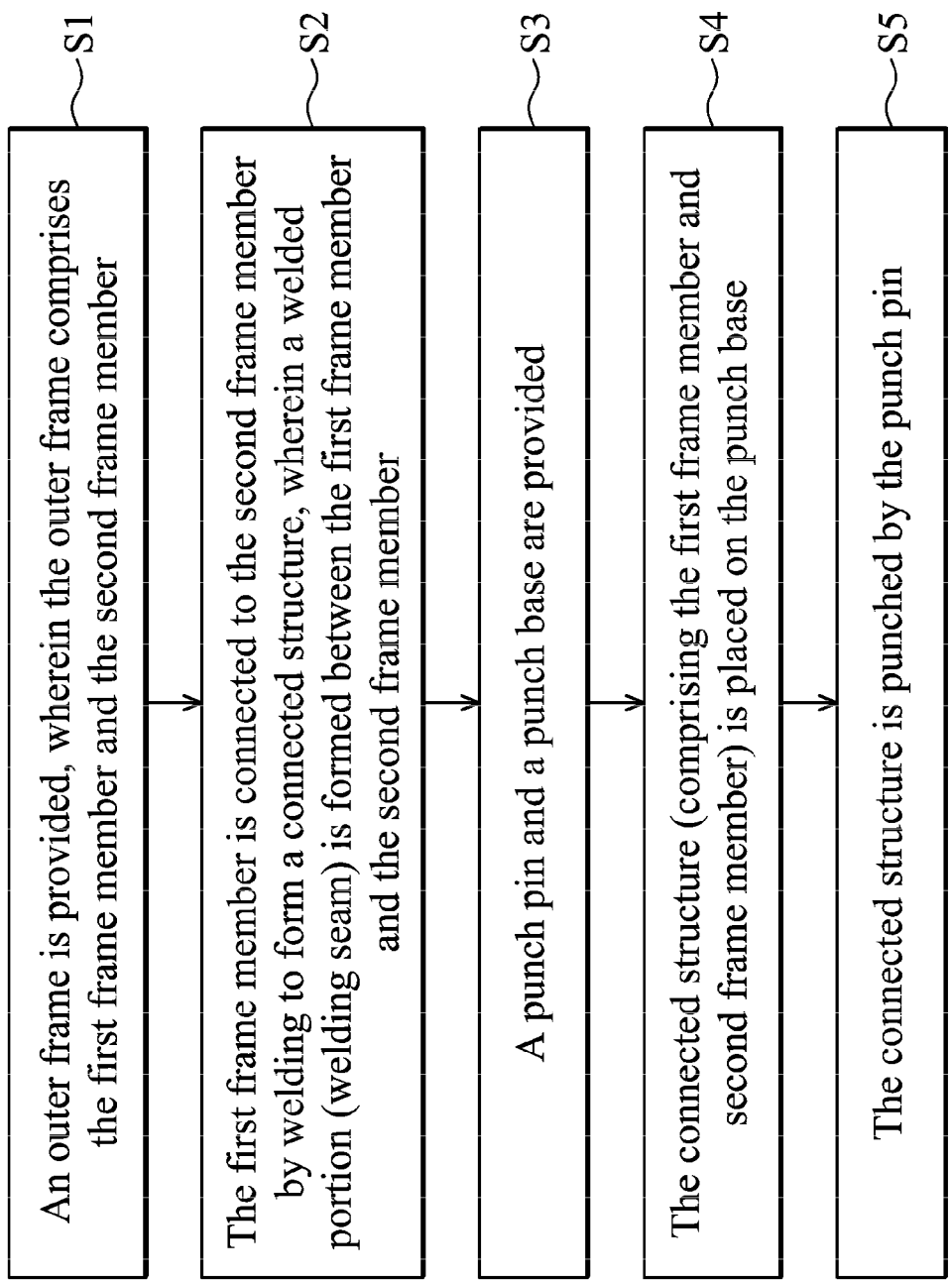
FIG. 2 shows the method for manufacturing the electronic device of the embodiment of the invention.

With reference to FIG. 2, a method for manufacturing the electronic device is described with the combination of the first frame member 110 and the second frame member 120, for example. First, an outer frame is provided, wherein the outer frame comprises the first frame member and the second frame member (S1). Next, the first frame member is connected to the second frame member by welding to form a connected structure, wherein a welded portion (welding seam) is formed between the first frame member and the second frame member (S2). Then, a punch pin and a punch base are provided (S3). Next, the connected structure (comprising the first frame member and second frame member) is placed on the punch base (S4). Finally, the connected structure is punched by the punch pin (S5).

Figure 3A:
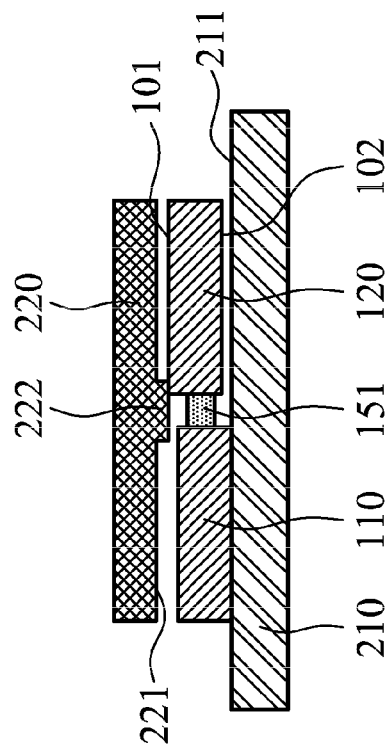
FIGS. 3A~3D show punch-shaping steps of the method for manufacturing the electronic device of the embodiment of the invention.
Figure 3C:
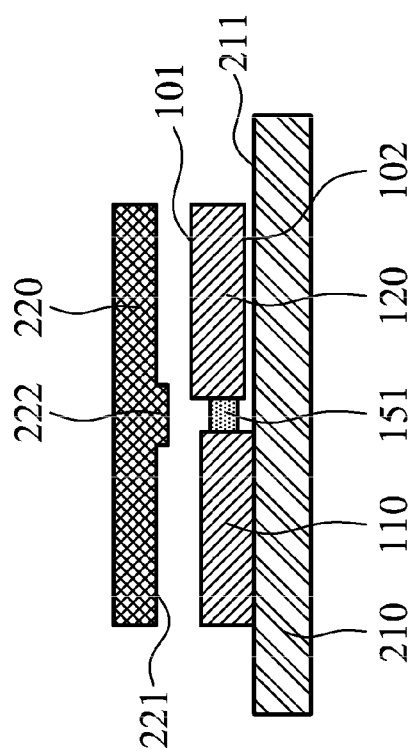
Figure 3B:
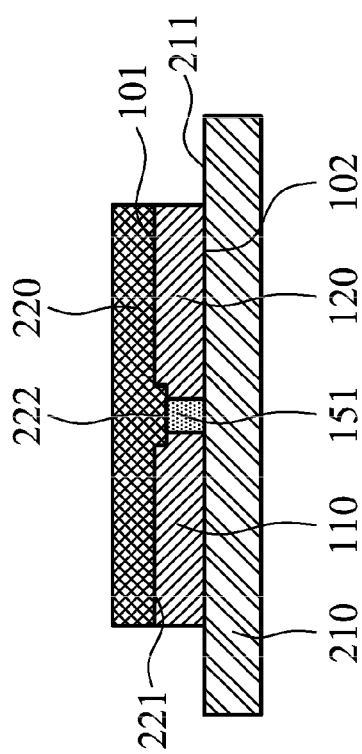

FIGS. 3A~3C show steps S3~S5 of the method for manufacturing the electronic device of the embodiment of the invention. With reference to FIG. 3A, a welded portion (welding seam) 151 is formed between the first frame member 110 and second frame member 120. The first frame member 110 and the second frame member 120 are placed on the punch base 210, and an elevation difference is formed between the first frame member 110 and the second frame member 120. With reference to FIGS. 3B and 3C, the first frame member 110, the second frame member 120 and the welded portion 151 are simultaneously punched with the punch pin 220.

With reference to FIG. 3A, in one embodiment, the first frame member 110 and the second frame member 120 are connected by laser welding. Therefore, the material thickness of the welded portion 151 is slightly thinner than the material thickness of the first frame member 110 and the second frame member 120. The punch base 210 comprises a base surface (planar) 211, and the first frame member 110 and the second frame member 120 are placed on the base surface 211 to be punched. The punch pin 220 comprises a shaping plane 221 and a shaping protrusion 222, the shaping protrusion 222 is formed on the shaping plane 221, and the shaping protrusion 222 corresponds to the welded portion 151.

With reference to FIGS. 3B~3C, when the punch-shaping process is performed, the shaping plane 221 contacts the first frame member 110 and the second frame member 120, and the shaping protrusion 222 contacts the welded portion 151 and neighboring portions of the welded portion 151 (a portion of the first frame member 110 and a portion of the second frame member 120).

In one embodiment, a width of the welded portion 151 is shorter than or equal to 0.5 mm, and a width of the shaping protrusion 222 is longer than the width of the welded portion 151 by 1 mm~2 mm.

Figure 3D:
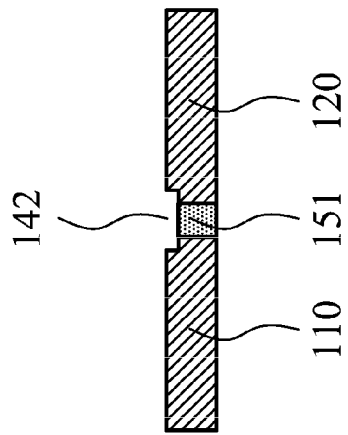
Figure 4B:
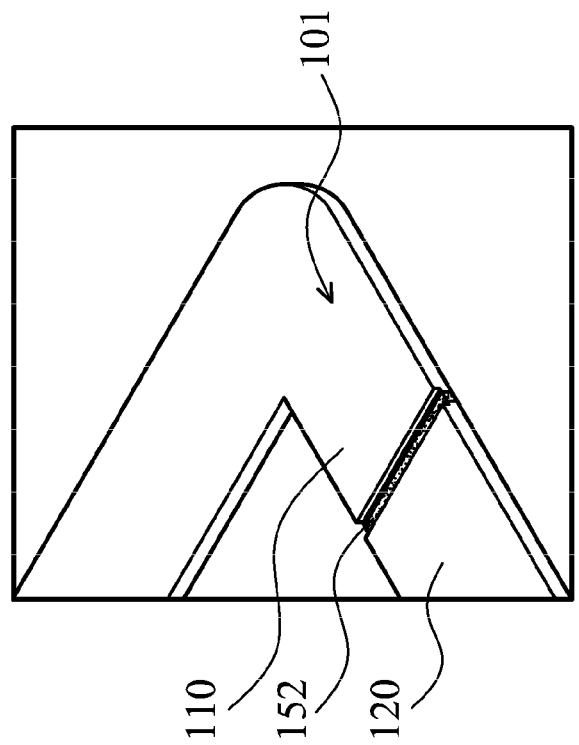
FIG. 4B shows the appearance of the welded portion at the inner surface of the outer frame.
Figure 4A:
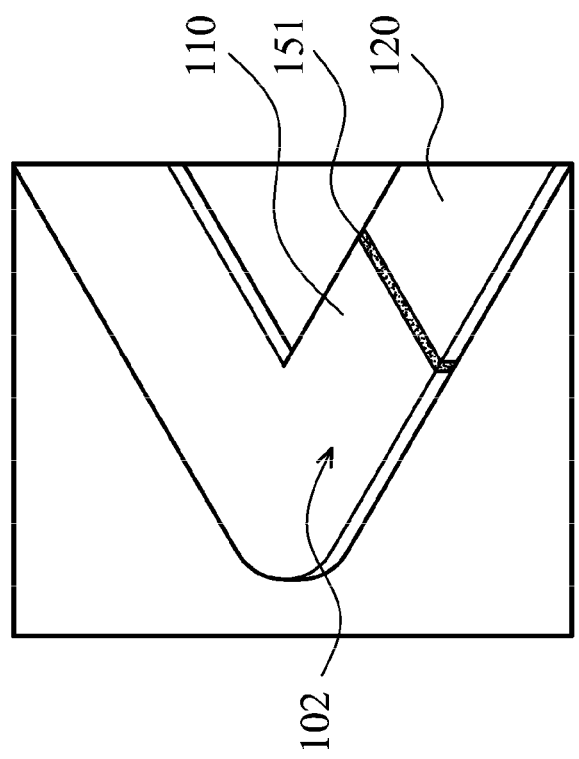
FIG. 4A shows the appearance of the welded portion at the outer surface of the outer frame.

With reference to FIGS. 3A~3C, the outer frame 100 comprises an inner surface 101 and an outer surface 102. When the electronic device is assembled, the inner surface 101 faces the liquid-crystal display module 10. When the punch-shaping process is performed, the outer surface 102 contacts the base surface 211, and the inner surface 101 contacts the punch pin 220. Therefore, with reference to FIG. 3D, after the punch-shaping process, the outer surface 102 comprises a planar area at the welded portion 151 (FIG. 4A), and the inner surface 101 comprises a groove 152 (FIG. 4B) formed over the welded portion. In one embodiment, a width of the groove 152 is longer than the width of the welded portion by 1 mm~2 mm.

An example of the combination of the first frame member 110 and the second frame member 120 is described above. The combination of the second frame member 120 and the third frame member 130, the combination of the third frame member 130 and the fourth frame member 140, and the combination of the fourth frame member 140 and the first frame member 110 can also utilize the manufacturing process described above, and the related details are omitted for brevity.

Utilizing the method for manufacturing the electronic device of the embodiment of the invention, the welded portion between the frame members is planarized by punch-shaping, and the material of the welded portion must not be removed. Therefore, a surface sinking problem at the welded portion is prevented in the following punch-bending process. Additionally, the appearance of the outer frame can be punch-shaped rapidly. Compared to the conventional polishing process, the method of the embodiment of the invention reduces work, time and cost.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for manufacturing an electronic device, comprising:
    providing an outer frame, wherein the outer frame comprises a first frame member and a second frame member;
    connecting the first frame member to the second frame member by welding to form a connected structure;
    providing a punch pin and a punch base;
    placing the connected structure on the punch base; and
    punching the connected structure with the punch pin;
    wherein the punch base comprises a base surface, and the first frame member and the second frame member are placed on the base surface to be punched; and
    wherein the punch pin comprises a shaping plane and a shaping protrusion, the shaping protrusion is formed on the shaping plane, and the shaping protrusion corresponds to a welded portion where the first frame member and the second frame member are connected to each other.

2. The method as claimed in claim 1, wherein the first frame member is connected to the second frame member by laser welding.

3. The method as claimed in claim 1, wherein when a punch-shaping process is performed, the shaping plane contacts the first frame member and the second frame member, and the shaping protrusion contacts the welded portion and a neighboring portion of the welded portion.

4. The method as claimed in claim 3, wherein a width of the welded portion is shorter than or equal to 0.5 mm.

5. The method as claimed in claim 4, wherein a width of the shaping protrusion is longer than the width of the welded portion by 1 mm~2 mm.

6. The method as claimed in claim 3, wherein the outer frame comprises an inner surface and an outer surface, and when the punch-shaping process is performed, the outer surface contacts the base surface, and the inner surface contacts the punch pin.

7. The method as claimed in claim 6, further comprising:
    providing a liquid-crystal display module, a diffuser, a prism sheet, a light guide and a back panel;
    combining the outer frame, the liquid-crystal display module, the diffuser, the prism sheet, the light guide and the back panel, wherein the inner surface faces the liquid-crystal display module.

* * * * *